(12) United States Patent
Imamura

(10) Patent No.: US 6,450,279 B1
(45) Date of Patent: Sep. 17, 2002

(54) DRIVE BELT SUSPENSION FOR SNOWMOBILE

(75) Inventor: Takashi Imamura, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/560,739

(22) Filed: Apr. 28, 2000

(30) Foreign Application Priority Data

Apr. 30, 1999 (JP) .......................................... 11-123940

(51) Int. Cl.⁷ .............................................. B62M 27/02
(52) U.S. Cl. ...................................... 180/193; 305/124
(58) Field of Search ................................ 180/193, 190; 305/124, 128

(56) References Cited

U.S. PATENT DOCUMENTS

| | | | |
|---|---|---|---|
| 3,613,811 A | * 10/1971 | Brandli | ............................ 180/5 |
| 3,721,308 A | * 3/1973 | Brandli et al. | ............... 180/5 R |
| 3,788,412 A | * 1/1974 | Vincent | ........................ 180/5 R |
| 3,863,727 A | * 2/1975 | Michrina | ..................... 180/5 R |
| 4,133,400 A | 1/1979 | Shiraishi | |
| 4,314,618 A | 2/1982 | Tamura | |
| 4,407,386 A | 10/1983 | Yasui et al. | |
| 4,462,480 A | 7/1984 | Yasui et al. | |
| 4,518,056 A | 5/1985 | Kobayashi | |
| 5,265,692 A | 11/1993 | Mallette | |
| 5,660,245 A | 8/1997 | Marier et al. | |
| 5,667,031 A | 9/1997 | Karpik | |
| 5,692,579 A | 12/1997 | Peppel et al. | |
| 5,730,242 A | 3/1998 | Furusawa | |
| 5,904,216 A | 5/1999 | Furusawa | |
| 5,944,134 A | * 8/1999 | Peppel et al. | ................. 180/193 |
| 5,947,220 A | * 9/1999 | Oka et al. | ..................... 180/193 |
| 6,109,382 A | * 8/2000 | Kubota | ........................ 180/190 |
| 6,161,908 A | * 12/2000 | Takayama et al. | ........... 305/124 |
| 6,234,264 B1 | * 5/2001 | Boivin et al. | ................. 180/193 |
| 6,283,241 B1 | * 9/2001 | Kubota | ........................ 180/193 |

FOREIGN PATENT DOCUMENTS

WO     WO 99/47411     9/1999

\* cited by examiner

*Primary Examiner*—Avraham Lerner
*Assistant Examiner*—Daniel Yeagley
(74) *Attorney, Agent, or Firm*—Knobbe, Martens, Olson & Bear, LLP (57) ABSTRACT

A drive belt suspension system for a snowmobile includes an improved construction in which an excessive shock is not directly received by the snowmobile frame to ensure a smooth operation of the suspension system. The suspension system includes a suspension arm arranged to suspend a slide rail assembly from a frame assembly of the snowmobile body. The suspension arm has a sleeve connected to the slide rail assembly for pivotal movement about a lower axis and a rod connected to the frame assembly for pivotal movement about an upper axis. The rod is supported by the sleeve and has a pair of stoppers that interpose the sleeve therebetween. The lower axis is positioned between the respective stoppers in a direction parallel to a longitudinal dimension of the drive belt suspension system.

30 Claims, 4 Drawing Sheets

DRIVE BELT SUSPENSION FOR SNOWMOBILE

PRIORITY INFORMATION

This application is based on and claims priority to Japanese Patent Application No. 11-123940, filed Apr. 30, 1999.

BACKGROUND OF THE INVENTION

1. Field of the Invention

This invention relates to a snowmobile and, more particularly to an improved drive belt suspension system for a snowmobile.

2. Description of Related Art

Typical snowmobiles employ a drive belt that is driven by the engine through a transmission for propelling the snowmobile along the terrain over which it is traversing. The drive belt conventionally runs over slide rails that back up the portion of the drive belt that contacts the ground. The slide rails are coupled to a frame assembly of the snowmobile by a suspension system for movement relative to the frame assembly. Conventionally, the slide rails are suspended by front and rear suspension units, each of which load a respective cushioning arrangement. In order to maintain a compact assembly, the suspension units and cushioning elements are generally positioned within the confine of the drive belt.

When the snowmobiles run on rough or irregular terrain, conventional suspension systems prevent immoderate pitching movements of the slide rail and maintain stable and comfortable running conditions for the rider. U.S. Pat. No. 5,667,031 discloses one of such suspension systems. The suspension system shown in this patent has rear suspension arms as well as cushion devices. One end of each arm is pivotally affixed to a frame assembly, while the other end thereof has a slide block that is slideably supported within a slot formed on the slide rail. This arrangement can absorb shocks exerted upon the snowmobile while traversing irregular terrain and restrict the movement of the arm in a limited range. However, the suspension system has a drawback that the slide rail is likely to be damaged by the shock that the slide rail itself receives directly because the slide blocks are confined within the slots formed on the slide rail.

U.S. Pat. No. 5,730,242 discloses another suspension system. The suspension system shown in this patent also has rear suspension arms. Each suspension arm comprises a sleeve and a control bar slideably supported by the sleeve. The sleeves are pivotally coupled with the slide rail, while the control bars are also pivotally connected to the frame assembly. A pair of stoppers are provided on each bar so as to restrict the movement of the bar. Therefore, like the arrangement described above, the suspension system can hold stable running conditions of the snowmobile. This arrangement, however, has another drawback that the bars are occasionally prevented from sliding smoothly within the sleeves.

SUMMARY OF THE INVENTION

A need therefore exists for an improved drive belt suspension system for a snowmobile in which a structural member, such as a slide rail, does not directly receive an excessive shock and in which the suspension system ensures a smooth movement of its suspension arms when traversing rough or irregular terrain.

In accordance with one aspect of the present invention, a snowmobile comprises a frame assembly and a drive belt. The snowmobile has a longitudinal axis. A slide rail assembly is engaged with a backside of the drive belt and opposite the terrain engaged by the drive belt for propelling the snowmobile along the terrain. A support device biases the frame assembly upwardly relative to the slide rail assembly. At least one suspension arm is arranged to couple the slide rail assembly to the frame assembly. The suspension arm includes a first member connected to the frame assembly for pivotal movement about a first axis and a second member connected to the slide rail assembly for pivotal movement about a second axis. One of the first and second members is slideably supported by the other. The one supported member has a pair of stoppers that interpose the other supporting member therebetween. The one axis that relates to the other supporting member (either the first or second axis) is positioned in the longitudinal direction between the respective stoppers.

Another aspect of the present invention involves a snowmobile comprising a frame assembly and a drive belt. A slide rail assembly is engaged with a backside of the drive belt and opposite the terrain engaged by the drive belt for propelling the snowmobile along the terrain. At least one support device biases the frame assembly upwardly relative to the slide rail assembly, and at least one suspension arm is arranged to couple the slide rail assembly to the frame assembly. The suspension arm includes a first member coupled with the frame assembly for pivotal movement about a first axis and a second member coupled with the slide rail assembly for pivotal movement about a second axis. One of the first and second members is slideably supported by the other member. At least one stopper is provided for restricting a slideable range of the supported member relative to the supporting member. The axis related to the supporting member is positioned in the longitudinal direction between both ends of the slideable range.

In accordance with an additional aspect of the present invention, a snowmobile comprises a frame assembly and a drive belt. A slide rail assembly is engaged with a backside of the drive belt and opposite the terrain engaged by the drive belt for propelling the snowmobile along the terrain. At least one support device is provided for biasing the frame assembly upwardly relative to the slide rail assembly, and at least one suspension arm is arranged to couple the slide rail assembly to the frame assembly. The suspension arm includes a first member connected to the frame assembly for pivotal movement about a first axis and a second member connected to the slide rail assembly for pivotal movement about a second axis. One of the first member and the second member is slideably supported by the other member along a slide axis. The axis related to the supporting member is offset from the slide axis.

A further aspect of the present invention involves a snowmobile comprising a frame assembly and a drive belt. A slide rail assembly is engaged with a backside of the drive belt and opposite the terrain engaged by the drive belt for propelling the snowmobile along the terrain. At least one support device is provided for biasing the frame assembly upwardly relative to the slide rail assembly, and at least one suspension arm is arranged to couple the slide rail assembly to the frame assembly. The suspension arm includes a sleeve connected to the slide rail assembly for pivotal movement about a lower axis and a rod connected to the frame assembly for pivotal movement about an upper axis. The rod is supported by the sleeve and has a pair of stoppers that interpose the sleeve therebetween. The lower axis is positioned in the longitudinal direction between the respective stoppers.

Further aspects, features and advantages of this invention will become apparent from the detailed description of the preferred embodiment and variations thereof which follows.

BRIEF DESCRIPTION OF THE DRAWINGS

These and other features of this invention will now be described with reference to the drawings of a preferred embodiment which is intended to illustrate and not to limit the invention.

DETAILED DESCRIPTION OF THE PREFERRED EMBODIMENT OF THE INVENTION

Figure 1:
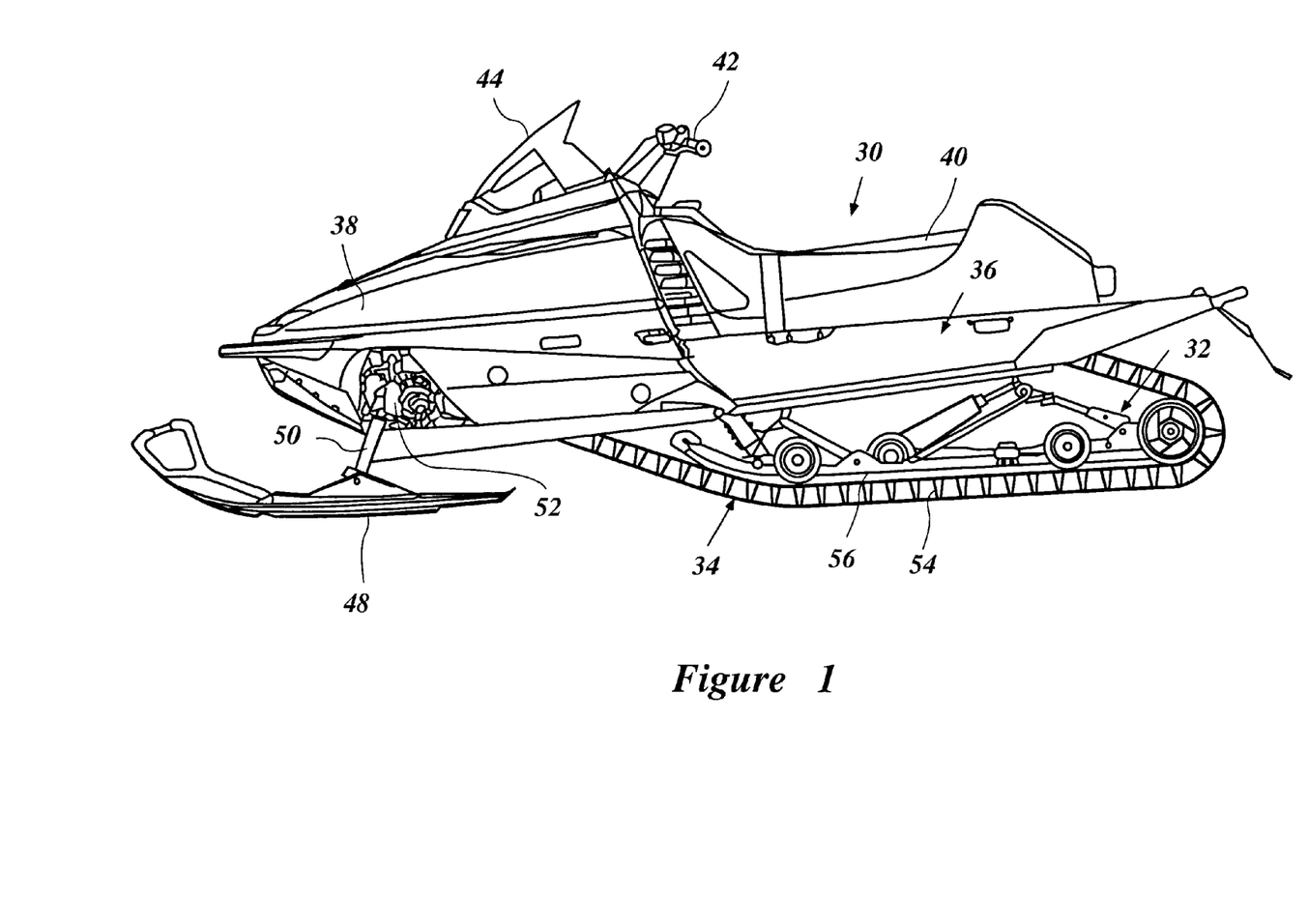
FIG. 1 is a side elevational view of a snowmobile constructed in accordance with an embodiment of the present invention.

With reference to FIG. 1, a snowmobile constructed in accordance with a preferred embodiment of the present invention is designated generally by the reference numeral 30. Because the invention primarily relates to a suspension system 32 for a drive mechanism 34, the overall construction of the snowmobile 30 will be described only generally. Where any components of the snowmobile 30 are not described in detail or not illustrated, reference may be had to any known prior art construction for such missing details.

The snowmobile 30 includes a frame assembly 36, which consists primarily of a pair of side frame members that are formed from sheet metal or the like. A cowling 38, which can be made of synthetic resin, covers the forward portion of the snowmobile 30 and a major portion of the rear part thereof. A seat 40 is disposed behind a control handlebar assembly 42 for operation of the snowmobile 30 by a rider seated on the seat 40. A windshield 44 is provided in front of the handle bar assembly 42 to protect the rider from snow and/or wind impinging upon him or her.

A pair of front skis 48 are journaled by respective ski suspension units 50 that include strut-type dampers 52 which operate hydraulically. The front suspension permits steering movement of the front skis 48 in a known manner. The handlebar assembly 42 controls this steering movement.

Contained within the interior of the front portion of the cowling 38 is an internal combustion engine of any known type. The engine powers the drive mechanism 34 that includes a transmission and drives a drive belt 54. The transmission may be of the continuously variable type and can include a centrifugal clutch. The drive belt 54 is an endless type and generally guided by a slide rail assembly 56. The suspension system 32 links the frame assembly 36 and the slide rail assembly 56.

The drive mechanism 34 and its suspension system 32 will now be described in more detail by reference to FIGS. 2 to 4.

A driveshaft 60 for a drive sprocket 62 is journaled upon the frame assembly 36 in a known manner and is driven through the engine/transmission combination. The sprocket 62 is engaged with the backside of the drive belt 54 and drives it through a suitable and well known type of cog mechanism.

The slide rail assembly 56 comprises a pair of spaced apart but interconnected slide rails 64. The slide rail assembly 56 cooperates with and engages the backside of the drive belt 54 and opposite the terrain engaged by the drive belt 54 for propelling the snowmobile 30 along the terrain. FIGS. 2–4 illustrate only one side of the slide rail assembly 56. That is, only one rail and the corresponding suspension structure are illustrated. The opposite side of the slide rail assembly, however, is a mirror image to that illustrated in the FIGS. 2–4 relative to the center line C of FIG. 3. Accordingly, the following describes only the one illustrated side of the slide rail assembly 56 with the understanding that this description applies equally to the other side of the assembly, unless stated otherwise.

Figure 2:
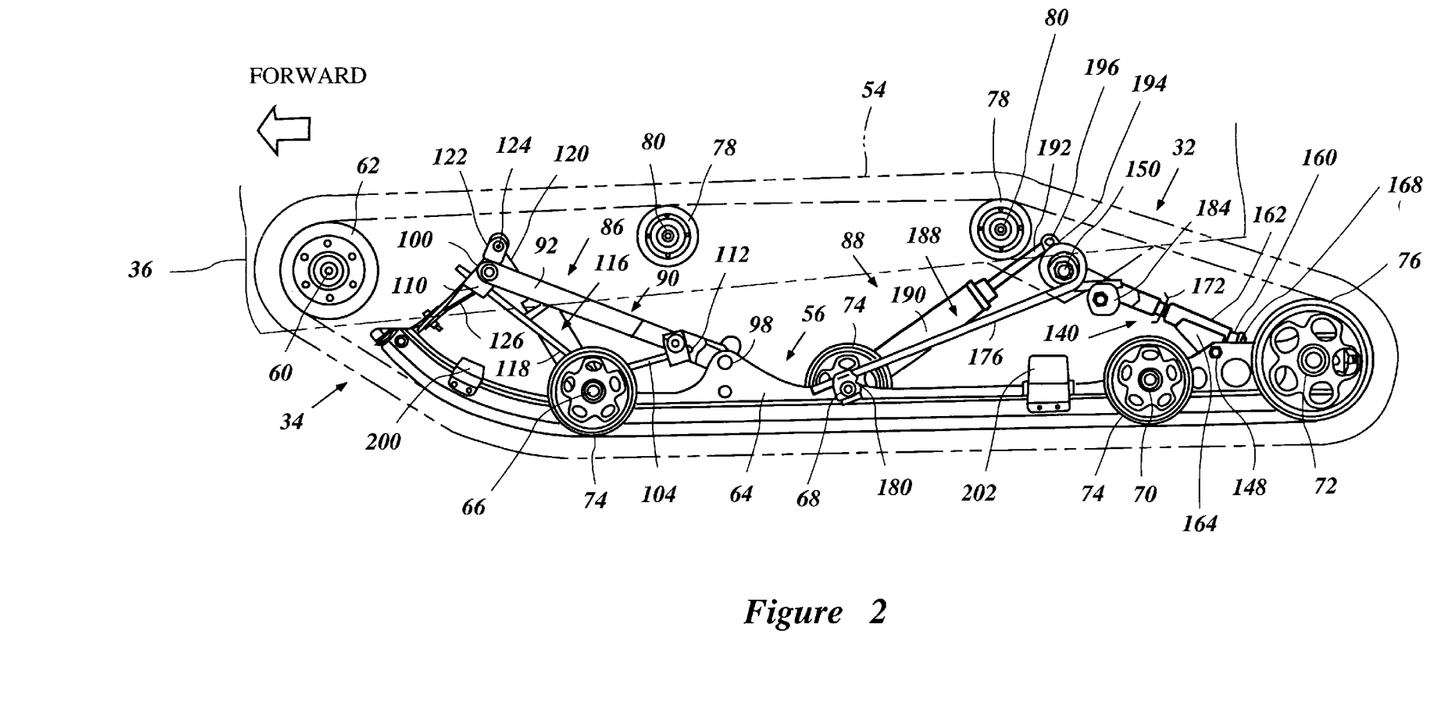
FIG. 2 is an enlarged side elevational view showing a drive belt suspension system of the snowmobile.
Figure 3:
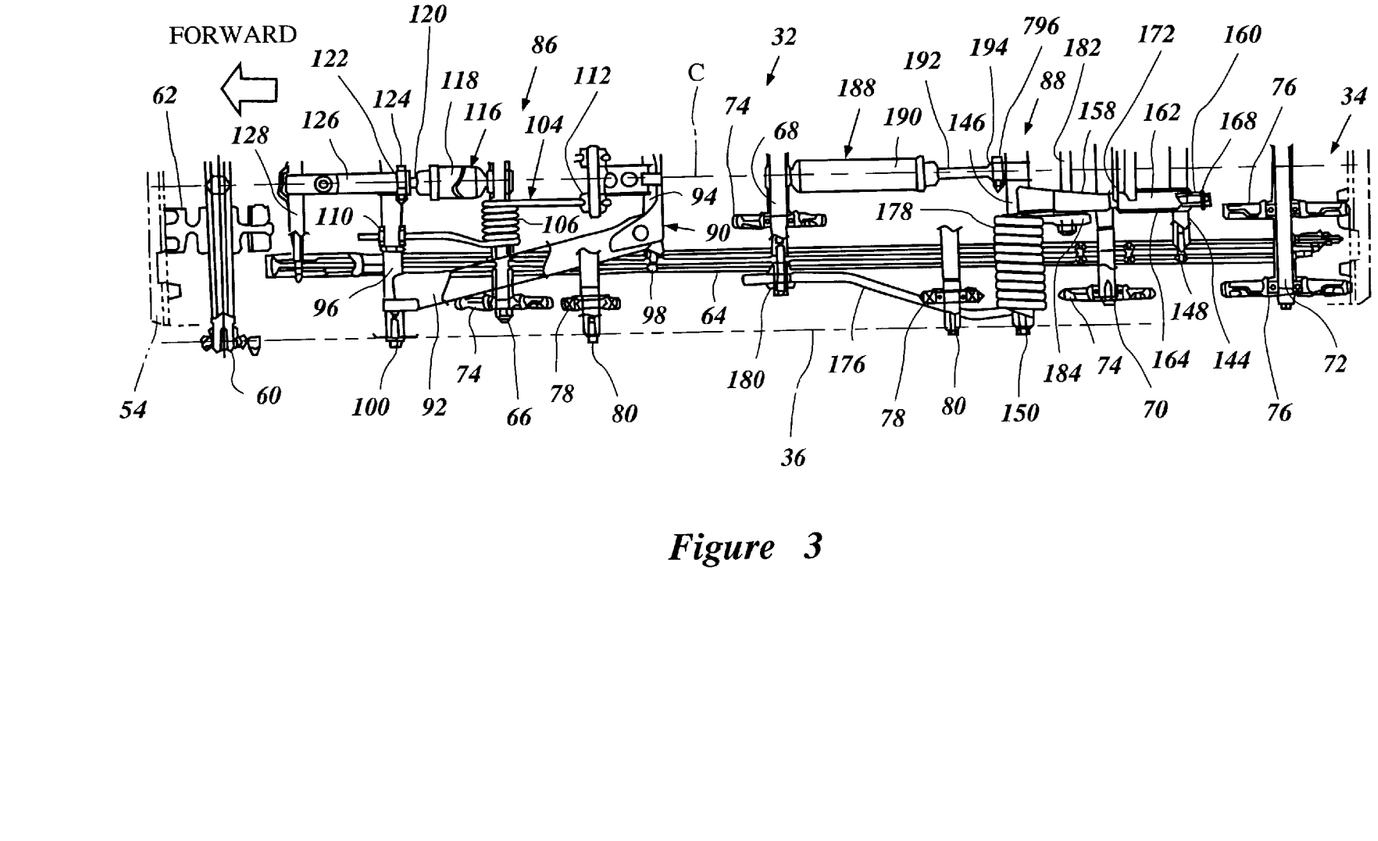
FIG. 3 is a top plan view showing the drive belt suspension system of the snowmobile with portions broken away. The right-hand half portion of the system is omitted because the system is formed symmetrically relative to the center line C.

As seen in FIGS. 2 and 3, the slide rail assembly 56 journals a plurality of roller shafts 66, 68, 70, 72 for backup rollers 74 and a larger idler roller 76 mounted at the rear end of the slide rail assembly 56. Each roller shaft is rotatably supported on and coupled to the pair of slide rails 64. Additionally, other backup rollers 78 are journaled upon the frame assembly 36 with their roller shafts 80. In the illustrated embodiment, six backup rollers 74 are provided on the slide rail assembly 56, while four backup rollers 78 are provided on the frame assembly 36. The drive belt 54 is, therefore, driven by the drive sprocket 62 and guided by the slide rail assembly 56 including the backup rollers 74 and idler roller 76 and additionally by the other backup rollers 78 placed on the frame assembly 36.

The suspension system 32 supports the slide rail assembly 56 for suspension movement relative to the frame assembly 36. This suspension system 32 includes a front suspension unit 86 and a rear suspension unit 88.

The front suspension unit 86 includes a front suspension arm assembly 90. The front suspension arm assembly 90 comprises a pair of suspension arms or links 92, a lower tubular member 94 and an upper tubular member 96. As best seen in FIG. 3, the lower and upper tubular members 94, 96 extend laterally (i.e., normal to the longitudinal axis of the slide rails 64 and are affixed to the suspension arms 92 at the lowermost and uppermost ends thereof, respectively, to construct a frame shape. The lower tubular member 94 is pivotally connected to a pivot pin 98 that connects to the respective slide rails 64. The upper tubular member 96, in turn, is also pivotally connected to a pivot pin 100 that connects to the frame assembly 36. Through this construction, the frame assembly 36 pivotally supports the front portion of the slide rail assembly 56 about the pivot pin 100 to permit the front portion to swing relative to the frame assembly 36.

In the illustrated embodiment, the front suspension unit 86 also includes a pair of torsion springs 104 (only one being illustrated in the figures as noted above). A coil portion 106 of each spring 104 is wound around the roller shaft 66 and is thereby affixed to the slide rails 64. One end of each spring 104 is affixed to the tubular member 96 by a bracket 110. The other end of each spring 104 is also affixed to the tubular member 94 by a bracket 112. Thereby, the torsion springs 104 bias the front portion of the frame assembly 36 upwardly relative to the slide rail assembly 56 against the weight of the snowmobile body and the rider(s). As the reaction to this force, the front portion of the track belt 54 is pressed against the terrain via the slide rail assembly 56. In addition, when the snowmobile 30 runs on irregular terrain, the torsion springs 104 can absorb shocks that would otherwise be transferred to the frame assembly 36.

The front suspension unit 86 further includes a hydraulic shock absorber 116 that is positioned along the central axis C of the suspension system 32. The shock absorber 116 comprises a cylinder member 118, a piston slideably supported within the cylinder member 118 and a piston rod 120 extending from the piston and beyond the cylinder member 118. The cylinder member 118 is pivotally affixed to the roller shaft 66, while the piston rod 120 is pivotally affixed to a bracket 122 by a pivot pin 124 that is mounted on the tubular member 96. The upper end of the shock absorber 116 thus is located above and off axis of the tubular member 96. The bracket 122 is rigidly coupled together with the suspension arms 92 through the tubular member 96. A working fluid is confined in the cylinder member 118. The piston includes a single orifice or multiple orifices that restrict smooth movement of the working fluid therethrough.

When the front arms 92 swing because the snowmobile 30 runs on the irregular terrain, the piston rod 120 of the shock absorber 116 expands and contracts so as to move the piston within the cylinder 118. However, the working fluid cannot pass quickly through the orifices. This restricted movement of the working fluid prevents the piston and hence the piston rod 120 from moving rapidly. Thus, the pitching movement of the front portion of the snowmobile body is absorbed by the shock absorber 116.

A connecting member 126 links a front traverse member 128 (FIG. 3) and the tubular member 96 to brace the front end of the slide rail assembly 56. The connecting member 126 is coupled together with the middle portions of both the front traverse member 128 and the tubular member 96.

The rear suspension unit 88 includes a rear suspension arm assembly 140 that has a different structure from the front suspension assembly 90. FIG. 4 illustrates the rear suspension arm assembly 140 in an enlarged view. With reference additionally to FIG. 4, the rear suspension unit 88 will be described.

The rear suspension arm assembly 140 comprises a pair of suspension arms or links 142, a lower tubular member 144 and an upper tubular member 146. The lower and upper tubular members 144, 146 are affixed to the suspension arms 142 at the lowermost and uppermost ends thereof, respectively, to construct a frame shape. The lower tubular member 144 is pivotally connected to a pivot pin 148 that interconnects the respective slide rails 64. The upper tubular member 146, in turn, is also pivotally connected to a pivot pin 150 that interconnects the frame assembly 36. The construction described above is almost similar to that of the front suspension arm assembly 90.

Figure 4:
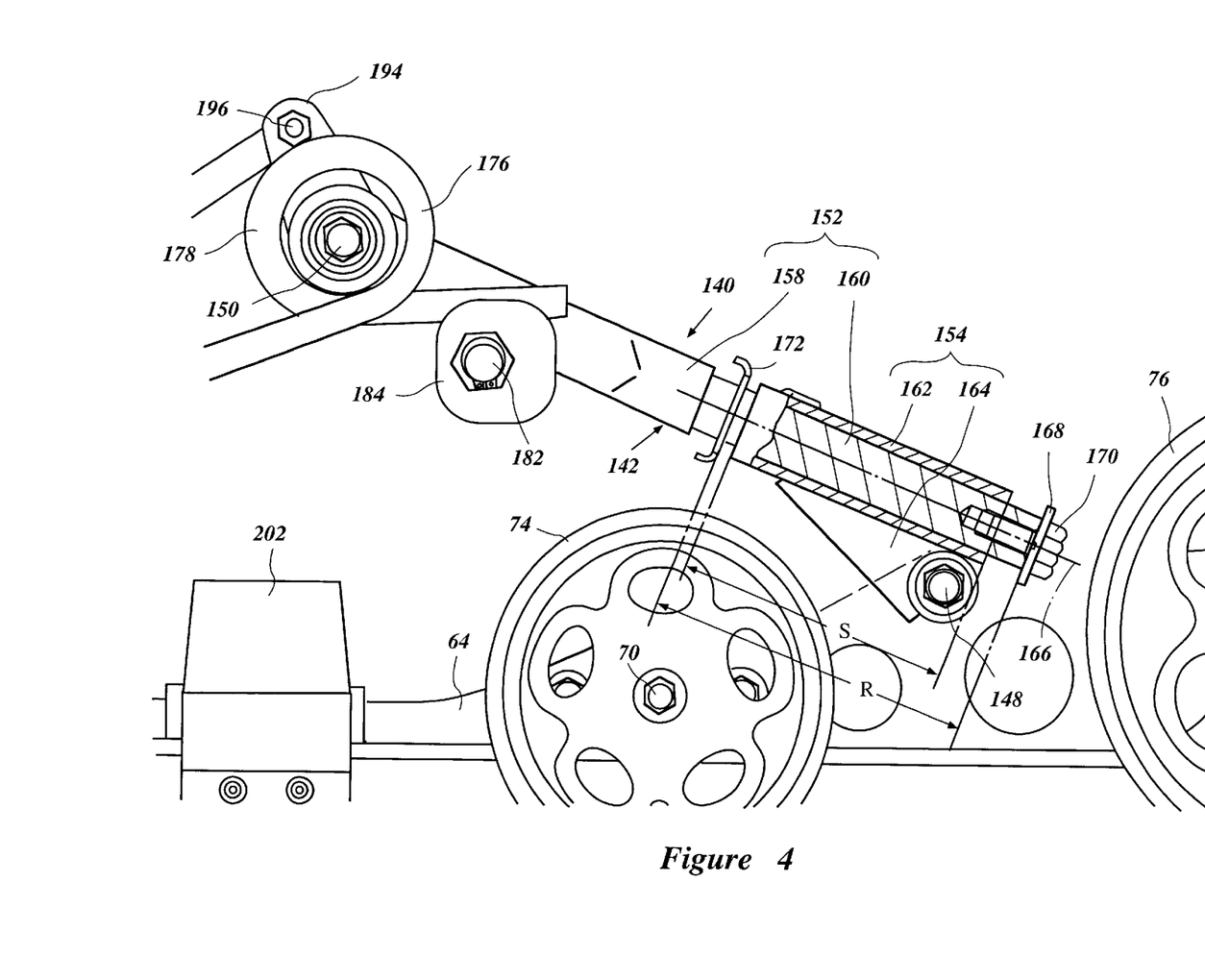
FIG. 4 is an enlarged side elevational view showing a rear suspension arm of the drive belt suspension system.

As best seen in FIG. 4, each rear suspension arm 142 has a telescopic construction and comprises a first part 152 and a second part 154. In the illustrated embodiment, the first part 152 includes a rectangular portion 158 and a columnar portion or rod 160. The rectangular portion 158 is located higher than the columnar portion 160 and is affixed to the upper tubular member 146 for pivotal movement about an axis of the pivot pin 150. The rectangular portion 158 may be formed from sheet metal. Although the columnar portion 160 can be also formed from sheet metal, in the illustrated embodiment, it is made of a solid metal material or other suitable materials (e.g., composites). Both of the rectangular portion 158 and the columnar portion 160 are welded together. The entire bodies of the suspension arms 142, of course, can be formed from solid metal material.

The second part 154 includes a cylindrical portion or sleeve 162 and a bracket 164. The bracket 164 is coupled with the lower tubular member 144 for pivotal movement about an axis of the pivot pin 148. The sleeve 162 is, therefore, pivotally connected to the slide rail assembly 56.

The sleeve 162 of the second part 154 slideably supports the rod 160 of the first part 152 along a slide or longitudinal axis 166. The pivot pin 148 is offset from the slide axis 166. Thus, the lower end portion of the rod 160, which is positioned opposite side of the rectangular portion 158, extends beyond the lower end portion of the sleeve 162.

A washer 168 that has a diameter larger than a diameter of the rod 160 is affixed to the lower end of the rod 160 by a bolt 170. The washer 168 is provided for restricting one end of a range R in which the rod 160 itself can movable within the sleeve 162. Thus, the washer 168 acts as a lower stopper. The other stopper 172 that restricts the other end of the range R is provided in the vicinity of the lower end of the rectangular portion 158. The stopper 172 is, therefore, positioned higher than the stopper 168. The sleeve 162 is, therefore, interposed between the two stoppers 168, 172. The distance between the two stoppers 168, 172, i.e., the length of the range R, is longer than the length S of the sleeve 162 so that the rod 160 can slide within the sleeve 162 in a certain interval. The upper stopper 172 is formed with a circular plate, which is made of sheet metal and has an aperture, and welded at the portion on the rod 172. In the illustrated embodiment, the periphery of the circular member that forms the stopper 172 is turned up toward the rectangular portion 158.

In a variation of the suspension system 32, the position of one or both of the stoppers 172, 168 can be varied in order to increase or decrease the range R. That is, the position of either stopper or both stoppers along the length of the rod 160 can be varied in order to change the range R as well as to change the relative position of the sleeve 162 within the range. Under some riding conditions, it may be desirably to permit no travel (i.e., set range R to equal the sleeve length S), and under other riding conditions, the operator can adjust the range R or can adjust the relative position of the sleeve within the range R to provide desired ride comfort and handling characteristics to the snowmobile.

In the illustrated embodiment, the pivot pin 148 is connected to and supports the sleeve 162, which in turn supports the rod 160, and the axis of the pivot pin 148 desirably is positioned between the stoppers 168, 172, that is, in the range R. This arrangement is advantageous because the rod 160 can slide smoothly within the sleeve 162. Preferably, the axis of the pivot pin 148 is positioned between both ends of the sleeve 162, that is, in the length S. The pivot pin 148, however, can be located either forward or backward of the range R and/or the length S.

When the snowmobile 30 runs on the irregular terrain, the suspension arms 142 swing about the axes of the pivot pins 148, 150. Since the respective arms 142 have the telescopic constructions, shocks from the terrain can be softened.

In the illustrated embodiment, the rear suspension unit 88 also includes a pair of torsion springs 176. A coil portion 178 of each spring 176 is wound around the upper tubular member 146 that is affixed to the frame assembly 36. One end of each spring 176 is affixed to the lateral end of the roller shaft 68 by a bracket 180. The other end of each spring 176 is also affixed to a transverse shaft 182 by a bracket 184. The shaft 182 thus links the free ends of the springs 176 together and is unattached to either the frame 36 or to the slide rails 64. Thereby, like the torsion springs 104 in the front suspension unit 86, these torsion springs 176 bias the rear portion of the frame assembly 36 upwardly relative to the slide rail assembly 56 against gravity, i.e., own weight of the snowmobile body and the rider. As the reaction to this force, the rear portion of the track belt 54 is pressed against the terrain via the slide rail assembly 56. In addition, when the snowmobile 30 runs on the irregular terrain, the torsion springs 104 can give a cushioning action.

The torsion springs 104, 176 also hold the sleeve 162 not to abut on either stopper 168, 172 when the snowmobile 30 is under a static condition. This static condition means a condition that the frame assembly 36 does not pitch up and down relative to the slide rail assembly 56 because the snowmobile 30 is at a standstill or runs on a relatively flat terrain. Since the sleeve 162 does not abut on any one of the stoppers 168, 172 under this condition, the rod 160 can slide in both directions within the sleeve 162 when the frame assembly 36 pitches up and down on the rough terrain. Accordingly, shocks can be properly softened as noted above. If a relatively large shock occurs, the sleeve 162 touches one of the stoppers 168, 172 and then it is interrupted to move beyond them. Thus, an excessive pitching movement is effectively precluded. It should be noted that the lower stopper 168 may abut the sleeve 162 under the static condition in another possible arrangement, but the arrangement described above is more preferable.

The rear suspension unit 88 further includes a hydraulic shock absorber 188 that comprises a cylinder member 190, a piston slideably supported within the cylinder member 190 and a piston rod 192 extending from the piston and beyond the cylinder member 190. The cylinder member 190 is pivotally affixed to the roller shaft 68, while the piston rod 192 is pivotally affixed to a bracket 194 by a pivot pin 196 that is mounted on the tubular member 146. The upper end of the shock absorber 188 thus is located above and off axis of the tubular member 146. The bracket 194 is rigidly coupled together with the suspension arms 142 through the tubular member 146. Like the shock absorber 116 in the front suspension unit 86, a working fluid is confined in the cylinder member 190 and the piston includes a single orifice or multiple orifices that restrict smooth movement of the working fluid therethrough.

When the rear suspension arms 142 swing because the snowmobile 30 runs on the irregular terrain, the suspension arms 142 actuate the piston rod 192 of the shock absorber 188 to expand and contract so as to move the piston within the cylinder member 190. However, the working fluid cannot move so fast through the orifices. This restricted movement of the working fluid prevents the piston and hence the piston rod 192 from moving rapidly. Thus, the pitching movement of the rear portion of the snowmobile body is well absorbed by this shock absorber 188.

The rear suspension arms 142 in the illustrated embodiment acts also as an actuator of the shock absorber 188 as noted above. This construction eliminates additional link members that exclusively actuates the shock absorber 188 and hence the rear suspension arm assembly 140 can be constructed in a more simple fashion.

Each slide rail 64 additionally carries a front stopper pad 200 and a rear stopper pad 202 which are adapted to abut the front suspension unit 86 and the rear suspension unit 88, respectively, when the slide rail assembly 56 swings upwardly.

In summary, in the illustrated arrangement, the torsion springs 104, 176 bias the frame assembly 36 upwardly relative to the slide rail assembly 56 against gravity, and also give cushioning actions when the snowmobile 30 runs on the irregular terrain. The front and rear suspension arms 90, 142 link the frame assembly 36 and the slide rail assembly 56, and also actuate the shock absorbers 116, 188 by their swing actions. Because of these actions, the pitching movements of the snowmobile body are absorbed. In addition, the telescopic constructions of the rear suspension arms 142 soften the shocks from the irregular terrain. However, since the stoppers 168, 172 restrict the range R in which the rod 160 can slide within the sleeve 162, excessive pitching movements are effectively precluded. This construction of the suspension assembly 32 consequently enhances acceleration performance, improves contact between the track belt 54 and the ground under deceleration conditions, and provides a more comfortable riding.

As described above, in the illustrated embodiment, the stoppers 168, 172 are not directly provided on a structural member such as a slide rail assembly 56 but on the rods 160 of the rear suspension arms 142 which are pivotally affixed to the frame and slide rail assemblies 36, 56. Accordingly, an excessive shock will not damage any structural member. In addition, the axis of the pivot pin 148 is positioned between the stoppers 168, is 172, that is, in the range R. Therefore, a smooth operation of the suspension arms 142 is well ensured.

It should be noted that the first part 152 and the second part 154 of the rear suspension arm 142 can be exchangeable with each other. That is, the first part may have a sleeve, while the second part may have a rod. In this arrangement, the bracket 164 is attached to the frame assembly 36.

The shock absorbers may have gas chambers that prevent bubbles from developing in the working fluid.

Also, the torsion springs can be replaced with other biasing elements such as coil springs disposed between the frame assembly and the slide rail assembly. The coil springs may be wound around shock absorbers.

Of course, the foregoing description is that of a preferred embodiment of the invention, and various changes and modifications may be made without departing from the spirit and scope of the invention, as defined by the appended claims.

What is claimed is:

1. A snowmobile comprising a frame assembly, a drive belt, a slide rail assembly engaged with a backside of the drive belt and opposite the terrain engaged by the drive belt for propelling the snowmobile along the terrain, and a suspension system including at least one support device and at least one suspension arm, the support device being arranged to bias the frame assembly upwardly relative to the slide rail assembly, the suspension arm being arranged to couple the slide rail assembly to the frame assembly, the suspension arm including a first member connected to the frame assembly for pivotal movement about a first axis and a second member connected to the slide rail assembly for pivotal movement about a second axis, one of the first and second members being slideably supported by the other one of the first and second members, the supported one of the first and second members having a pair of stoppers that interpose the supporting one of the first and second members therebetween, and one of the first and second axes associated with the supporting one of the first and second members being positioned between the respective stoppers in a longitudinal direction.

2. A snowmobile as set forth in claim 1, wherein the supporting member includes a sleeve, and the supported member includes a rod that is slideably supported within the sleeve.

3. A snowmobile as set forth in claim 2, wherein the sleeve is pivotally connected to the slide rail assembly and the rod is pivotally connected to the frame assembly.

4. A snowmobile as set forth in claim 2, wherein one of the stoppers is mounted generally on an end portion of the rod.

5. A snowmobile as set forth in claim 4, wherein the stopper mounted generally on the end portion of the rod includes a washer affixed by a bolt.

6. A snowmobile as set forth in claim 2, wherein one of the stoppers is formed with a circular plate provided on the rod.

7. A snowmobile as set forth in claim 2, wherein the rod is made of solid material.

8. A snowmobile as set forth in claim 1, wherein the stoppers limit relative movement between the supported member and the supporting member.

9. A snowmobile as set forth in claim 1, wherein the suspension system comprises a front suspension arm and a rear suspension arm, and the rear suspension arm is the suspension arm that includes the first member and the second member.

10. A snowmobile as set forth in claim 1, wherein one of the stoppers is positioned higher than the other stopper, and the supporting member does not abut at least on the stopper positioned higher than the other stopper under a static condition of the snowmobile.

11. A snowmobile as set forth in claim 1, wherein the supporting member does not abut on any one of the stoppers under a static condition of the snowmobile.

12. A snowmobile as set forth in claim 1, wherein the support device includes a spring that is set between the frame assembly and the slide rail assembly.

13. A snowmobile as set forth in claim 12, wherein the spring includes a torsion spring.

14. A snowmobile as set forth in claim 1, wherein the axis that associated with the supporting member is positioned between both ends of the supporting member.

15. A snowmobile as set forth in claim 1 additionally comprising a shock absorber arranged to extend between the slide rail assembly and the first member, and the first member actuating the shock absorber by its pivotal movement about the first axis.

16. A snowmobile as set forth in claim 1, wherein one of the first and second axes that is associated with the supporting member is offset from a slide axis of the slideably supported member.

17. A snowmobile comprising a frame assembly, a drive belt, a slide rail assembly engaged with a backside of the drive belt and opposite the terrain engaged by the drive belt for propelling the snowmobile along the terrain, and a suspension system including at least one support device and at least one suspension arm, the support device being arranged to bias the frame assembly upwardly relative to the slide rail assembly, the suspension arm being arranged to couple the slide rail assembly to the frame assembly, the suspension arm including a first member coupled with the frame assembly for pivotal movement about a first axis and a second member coupled with the slide rail assembly for pivotal movement about a second axis, one of the first and second members being slideably supported by the other one of the first and second members such that one of the first and second members is a supported member and the other is a supporting member, and a stopper mechanism arranged to restrict a slideable range of the supported member, and one of the first and second axes associated with the supporting member being positioned between both ends of the slideable range in a longitudinal direction.

18. A snowmobile as set forth in claim 17, wherein the first member is supported by the second member, and the stopper is arranged on the first member.

19. A snowmobile comprising a frame assembly, a drive belt, a slide rail assembly engaged with a backside of the drive belt and opposite the terrain engaged by the drive belt for propelling the snowmobile along the terrain, and a suspension system including at least one support device and at least one suspension arm, the support device being arranged to bias the frame assembly upwardly relative to the slide rail assembly, the suspension arm being arranged to couple the slide rail assembly to the frame assembly, the suspension arm including a first member connected to the frame assembly for pivotal movement about a first axis, and a second member connected to the slide rail assembly for pivotal movement about a second axis, one of the first and second members being slideably supported by the other one of the first and second members along a slide axis such that one of the first and second members is a supported member and the other is a supporting member, and one of the first and second axes associated with the supporting member being offset from the slide axis.

20. A snowmobile as set forth in claim 19, wherein one of the first and second members includes a sleeve, and the other one of the first and second members includes a rod that is slideably supported within the sleeve.

21. A snowmobile as set forth in claim 19, wherein the support device includes a spring that is set between the frame assembly and the slide rail assembly.

22. A snowmobile comprising a frame assembly, a drive belt, a slide rail assembly engaged with a backside of the drive belt and opposite the terrain engaged by the drive belt for propelling the snowmobile along the terrain, at least one support device to bias the frame assembly upwardly relative to the slide rail assembly, at least one suspension arm arranged to couple the slide rail assembly to the frame assembly, the suspension arm including a sleeve connected to the slide rail assembly for pivotal movement about a lower axis and a rod connected to the frame assembly for pivotal movement about an upper axis, the rod being supported by the sleeve and having a pair of stoppers that interpose the sleeve therebetween, and the lower axis being positioned between the respective stoppers in a longitudinal direction.

23. A snowmobile as set forth in claim 22, wherein the sleeve includes a bracket, the sleeve affixed to the slide rail assembly pivotally about the lower axis, and the lower axis is offset from a slide axis of the rod.

24. A snowmobile comprising a frame assembly, a drive belt, a slide rail assembly engaged with a backside of the drive belt and opposite the terrain engaged by the drive belt for propelling the snowmobile along the terrain, and a suspension system including at least one support device and at least one suspension arm, the support device being arranged to bias the frame assembly upwardly relative to the slide rail assembly, the suspension arm being arranged to couple the slide rail assembly to the frame assembly, the suspension arm including a first member connected to the frame assembly for pivotal movement about a first axis, and a second member connected to the slide rail assembly for pivotal movement about a second axis, one of the first and second members being slideably supported by the other one of the first and second members, the supported member having a pair of stoppers with the supporting member disposed between the stoppers such that the supporting member does not abut on either of the pair of stoppers under a static condition of the snowmobile.

25. A snowmobile as set forth in claim 24, wherein the supporting member comprises a sleeve and the supported member comprises a rod that is slideably supported within the sleeve.

26. A snowmobile comprising a frame assembly, a drive belt, a slide rail assembly engaged with a backside of the drive belt and opposite the terrain engaged by the drive belt for propelling the snowmobile along the terrain, and a suspension mechanism being arranged to couple the slide rail assembly with the frame assembly, the suspension mechanism including a first member connected to one of the frame assembly and the slide rail assembly for pivotal movement about a first axis, and a second member connected to the other one of the slide rail assembly and the frame assembly for pivotal movement about a second axis, the second member being slideably connected to the first member, the first member having a pair of stoppers that interpose the second member therebetween, and the second axis being positioned between the respective stoppers in a longitudinal direction.

27. A snowmobile as set forth in claim 26, wherein the first member comprises a rod and the second member comprises a sleeve that slideably supports the rod.

28. A snowmobile comprising a frame assembly, a drive belt, a slide rail assembly engaged with a backside of the drive belt and opposite the terrain engaged by the drive belt for propelling the snowmobile along the terrain, and a suspension mechanism being arranged to couple the slide rail assembly with the frame assembly, the suspension mechanism including a first member coupled with one of the frame assembly and the slide rail assembly for pivotal movement about a first axis, and a second member coupled with the other one of the slide rail assembly and the frame assembly for pivotal movement about a second axis, the second member being slideably connected to the first member, and a stopper mechanism arranged to restrict a slideable range of the first member, the second axis being positioned between both ends of the slideable range in a longitudinal direction.

29. A snowmobile comprising a frame assembly, a drive belt, a slide rail assembly engaged with a backside of the drive belt and opposite the terrain engaged by the drive belt for propelling the snowmobile along the terrain, and a suspension mechanism being arranged to couple the slide rail assembly with the frame assembly, the suspension mechanism including a first member connected to one of the frame assembly and the slide rail assembly for pivotal movement about a first axis, a second member connected to the other one of the slide rail assembly and the frame member for pivotal movement about a second axis, the supporting member being slideably connected to the first member along a slide axis, and the second axis being offset from the slide axis.

30. A snowmobile comprising a frame assembly, a drive belt, a slide rail assembly engaged with a backside of the drive belt and opposite the terrain engaged by the drive belt for propelling the snowmobile along the terrain, and a suspension mechanism being arranged to couple the slide rail assembly with the frame assembly, the suspension arm including a first member connected to one of the frame assembly and the slide rail assembly for pivotal movement about a first axis and a second member connected to the other one of the slide rail assembly and the frame assembly for pivotal movement about a second axis, the second member slideably supporting the first member, the first member having a pair of stoppers that interpose the second member therebetween, and the second member not abutting on any one of the stoppers under a static condition of the snowmobile.

* * * * *